G. A. LUTZ.
OUTLET OR JUNCTION BOX.
APPLICATION FILED JULY 23, 1908.
917,328.
Patented Apr. 6, 1909.
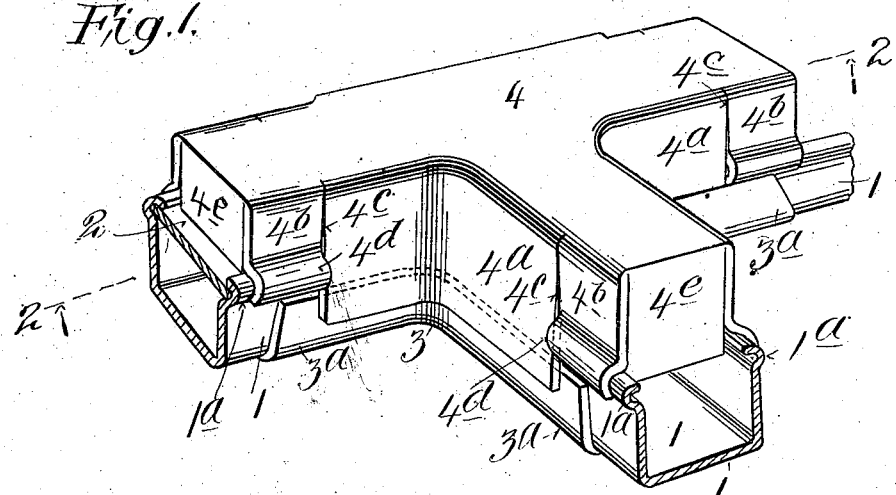
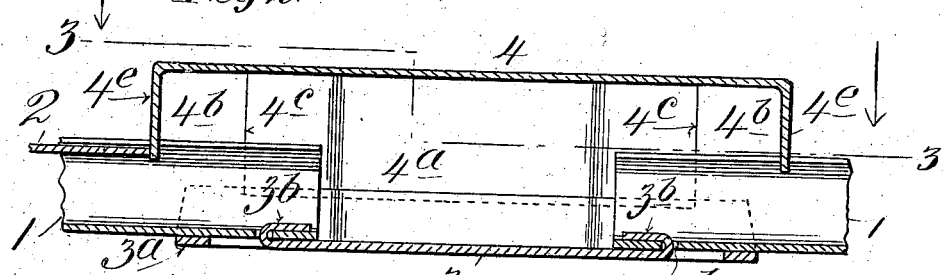
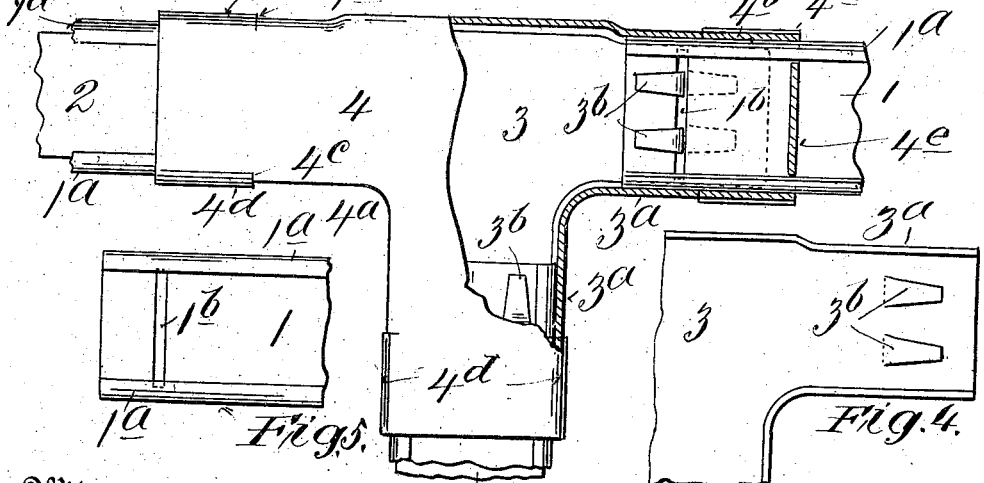
Witnesses:
C. W. Benjamin
Marie G. Cainright
Inventor
George A. Lutz.
By his Attorney
T. F. Bourne

UNITED STATES PATENT OFFICE.

GEORGE A. LUTZ, OF PLAINFIELD, NEW JERSEY.

OUTLET OR JUNCTION BOX.

No. 917,328.          Specification of Letters Patent.          Patented April 6, 1909.

Application filed July 23, 1908. Serial No. 444,894.

*To all whom it may concern:*

Be it known that I, GEORGE A. LUTZ, a citizen of the United States, and resident of Plainfield, in the county of Union and State of New Jersey, have invented certain new and useful Improvements in Outlet or Junction Boxes, of which the following is a specification.

The object of my invention is to provide improved means for detachably connecting the caps or covers of outlet or junction boxes, or other analogous fittings, directly in connection with metal conduits for electric wires, whereby access may readily be had to the interior of the boxes or fittings, and yet good electric contact between such cap or cover and the conduits may be had, while also providing a convenient space within the box or fitting for making electric connections and closing any openings between the box, the cap or cover and the conduits.

The invention also comprises the novel details of improvement and combinations of parts that will be more fully hereinafter set forth and then pointed out in the claims.

Reference is to be had to the accompanying drawings forming part hereof, wherein—

Figure 1 is a perspective view of an outlet or junction box embodying my improvements, showing the conduits in section; Fig. 2 is a section substantially on the line 2, 2, in Fig. 1; Fig. 3 is a plan view, partly broken on the plane of the line 3, 3, in Fig. 2; Fig. 4 is a detail of one of the branches of the box, and Fig. 5 is a detail view of one end of a conduit.

Similar numerals of reference indicate corresponding parts in the several views.

The numeral 1 in the drawings indicates conduits adapted to contain electric wires, which conduits are of the character having removable covers 2, which covers may be detachably connected with the conduits in any suitable manner. In the construction shown said conduits are shown provided with projecting portions, indicated at $1^a$, providing grooves in which the covers 2 are adapted to fit, and in which grooves the covers may slide.

The junction box or receptacle is indicated generally at 3 and its removable cap or cover at 4, said box being shown open on one side and provided with a plurality of branches $3^a$, respectively adapted to receive the conduits 1 which project into the branches a suitable distance, as between the bottom and side walls of said branches, providing a bond-like connection. I have shown the ends of branches $3^a$ provided with tongues $b^3$ adapted to pass through slots $1^b$ in conduits 1 to firmly and detachably hold the parts together. The cap or cover 4 corresponds substantially in outline to the form of the box and is provided with flanges or walls $4^a$ that overlap, and are shown extending along, the outer sides of the corresponding walls of the box and the adjacent ends of the conduits, and at $4^b$ the cap or cover 4 is extended beyond the flanges or walls $4^a$ over the respective conduits, the metal being slit as at $4^c$, and the lower portions of the webs or walls at $4^d$ are curved or bent to engage and grip the conduits, as at the projecting portions $1^a$ thereof, whereby a close fit is made between said parts and the cap or cover is securely detachably connected with the conduits, the portions $4^b$ of the cap or cover having sufficient resiliency to enable the curved portions $4^d$ to snap over or upon the corresponding portions of the conduits.

By the means described, the cap or cover is securely attached to the conduits and electrical contact is made therewith, and the portions $4^a$, $4^b$ cover the joints of the conduits and box effectively. At the ends of the branch portions of the cap or cover that overlie the branches of the box and the conduits are closing end walls $4^e$, formed from the metal blank for the cap or cover and shown bent down between the portions $4^b$ and extending sufficiently far to make a close fit with the covers 2, preferably by extending into the conduits in line with the corresponding cover 2, as indicated in Fig. 2, whereby the cover 2 is prevented from sliding too far within the box.

The outlet box may be made of suitable shape and may have any desired number of branches or outlets, the cap or cover 4 having a similar number of branches and the means, such as $4^d$, for gripping the conduits. After the wires are laid in the box and any suitable connection made therein, the cap or cover 4 may readily be placed upon the box, and by pushing the same down the parts $4^d$ thereof may be caused to engage and grip the conduits and thereby the cap or cover is held securely in place without the necessity of using other fastenings, and the cap or cover may be readily removed by lifting it off, the parts 4ᵇ, 4ᵈ having sufficient resiliency for the purpose.

While I have referred to my improvements as applied in an outlet or junction box it will be understood that the same may be used for attachment directly to conduits, with other analogous fittings for electric devices in connection with metal conduits, such as the well known rosettes or other receptacles used for taking off branch lines from electric conductors, and for making other similar connections.

By the arrangements described the cap or cover 4 may be made in raised or hollow form above the box and conduits to provide an interior space in which connections of the contained conductors may be made, and such cap or cover will be supported by and upon the conduits and above the same.

Having now described my invention what I claim is:—

1. The combination of a conduit and a box operatively associated therewith, with a cap having depending walls to overlap the box walls, said cap being provided with means to engage the walls of the conduit to retain the cap in position.

2. The combination of a conduit and a box operatively associated therewith, with a cap having depending walls to overlap the box walls and having means to engage the sides of the conduit to retain the cap in position, said cap having end closures.

3. The combination of a conduit having a cover and a box receiving the conduits, with a cap having depending walls to overlap the box walls and provided with means to engage the conduit, said cap having end closures adjacent said means and projecting in line with the cover of the conduit.

4. The combination of a box and conduits, and means to secure the conduits to the box, with a cap having depending walls to overlap the box and provided with bent portions to engage the walls of the conduits to retain the cap in position.

5. The combination of a box and conduits, and means to secure the conduits to the box, with a cap having depending walls to overlap the box and provided with bent portions to engage the conduits, and closures for the ends of the cap.

6. The combination of a box and conduits operatively alined therewith, with a cap comprising a piece of metal bent to form top and side walls, the latter being provided with slits forming intermediate wall portions and end walls, the latter being bent to engage the conduits.

7. The combination of conduits having projecting portions on opposite sides and removable covers engaging said projecting portions, with a box, means to connect said box with said conduits, a cap having top and side walls, the latter having slits providing separate depending walls, the end walls having bent portions to engage the projecting portions of the conduit.

8. The combination of conduits having projecting portions on opposite sides and removable covers engaging the projecting portion of the conduits, with a box alined with the conduits, means to connect said box with said conduits, a cap having top and side walls, the later having slits providing separate depending walls, the end walls having bent portions to engage corresponding portions of the conduit, and closures at the ends of the cap.

9. The combination of a box having at least three branches one of which is substantially at right angles to the others, conduits adapted to coincide with said branches and means to connect the conduits with the box, with a cap having intermediate walls to overlap the walls of the box and provided with branches corresponding to the branches of the box, the end portions of said branches being free from said walls of the cap, and bent to correspond with the conduits for engagement therewith.

10. The combination of a box and conduits, and means to secure the conduits to the box from displacement, with a cap fitting over the box and having means to engage the sides of the conduits to hold the cap in place.

11. The combination of a box and conduits, and means to secure the conduits to the box from displacement, with a cap fitting over the box and having bent portions to engage the sides of the conduits to hold the cap in place.

12. The combination of a box and conduits operatively associated therewith, with a cap made in hollow form to fit over the box to form a space over the box, said cap having means to engage the sides of the conduits to hold the cap in place.

13. The combination of a box and conduits operatively associated therewith, with a cap made in hollow form to fit over the box to form a space over the box, said cap having bent portions to engage the sides of the conduits to hold the cap in place, said cap having end closures.

14. An outlet box provided with a cap made in hollow form having depending walls to overlap the box and also having bent portions to engage the sides of conduits, and closures at the ends of the cap.

15. An outlet box having a cap made in hollow form having slits in its side walls, portions of said walls being bent to engage conduits.

16. An outlet box having a cap made in hollow form having slits in its side walls, portions of said walls being bent to engage conduits, and closing walls at the ends of the cap.

Signed at New York city, in the county of New York, and State of New York, this 17th day of July, A. D. 1908.

GEORGE A. LUTZ.

Witnesses:
T. F. BOURNE,
MARIE T. WAINRIGHT.